United States Patent [19]

Hamilton

[11] 4,411,204
[45] Oct. 25, 1983

[54] METHOD OF FIRING A PULVERIZED FUEL-FIRED STEAM GENERATOR

[75] Inventor: Thomas B. Hamilton, Farmington, Conn.

[73] Assignee: Combustion Engineering, Inc., Windsor, Conn.

[21] Appl. No.: 327,844

[22] Filed: Dec. 7, 1981

[51] Int. Cl.³ ............................................. F23D 1/00
[52] U.S. Cl. .................................. 110/347; 110/106; 110/188; 236/15 E
[58] Field of Search ............... 110/186, 188, 190, 232, 110/234, 347, 106; 122/449, 1 A; 236/15 BD, 15 E

[56] References Cited

U.S. PATENT DOCUMENTS

| 2,867,182 | 1/1959 | Crites | 110/347 |
| 3,043,525 | 7/1962 | Gilbert | 110/106 |
| 3,050,018 | 8/1962 | Pearson | 110/106 |
| 3,519,254 | 7/1970 | Putnam | 236/15 E |

Primary Examiner—Edward G. Favors
Assistant Examiner—Steven E. Warner
Attorney, Agent, or Firm—William W. Habelt

[57] ABSTRACT

A method of firing a pulverized fuel-fired steam generator furnace wherein a mixture of recirculated cleaned flue gas and air is supplied to the mill for drying the pulverized fuel in the mill and transporting the pulverized fuel to the furnace. The volume flow rate of the gaseous mixture of recirculated flue gas and air is controlled in response to the feed rate of fuel to the mill to maintain a mixture to fuel ratio in the transport stream of about but not less than 1.5. The volume flow rate of recirculated flue gas with respect to the volume flow rate of air is controlled to maintain the oxygen content of the gaseous mixture at a level of at least 12% by volume and preferably in the range of 12 to 15% by volume.

3 Claims, 2 Drawing Figures

METHOD OF FIRING A PULVERIZED FUEL-FIRED STEAM GENERATOR

BACKGROUND OF THE INVENTION

The present invention relates generally to the operation of pulverized fuel-fired steam generator furnaces and, more particularly, to a method of firing a pulverized fuel-fired steam generator furnace by conveying the fuel pulverized in the mill to the furnace entrained in a gaseous mixture of recirculated flue gas and air wherein the volume flow rate of the gaseous mixture is controlled in response to the feed rate of fuel to the mill and the volume flow rate of air in the gaseous mixture is controlled to maintain a desired oxygen level in the gaseous mixture entering the mill.

In firing solid fossil fuels, such as coal, lignite and peat, the fuel must be comminuted and dried before it can be introduced into the furnace. This is accomplished in the mill wherein the solid fuel is simultaneously pulverized and substantially dried. In order to obtain sufficient heat for adequate drying, a hot gaseous medium is admitted to the mill in a quantity necessary to provide sufficient heat to evaporate moisture in the fuel. The same gaseous medium is then used to transport the pulverized coal from the mill to the furnace for combustion therein.

Typically, the gaseous medium supplied to the mill for drying and subsequent transport of the pulverized fuel to the furnace is preheated air. As the pulverized fuel-air mixture enters the furnace and combustion begins, this oxygen is readily available to oxidize constituents in the pulverized fuel. One constituent of pulverized fuel is nitrogen bound in the complex organic structure of the fuel. This nitrogen tends to readily combine with oxygen in the earlier stages of combustion to form nitric oxide, a major pollutant. Thus there is concern that a high air to coal ratio in the transport stream could lead to increased formation of nitrogen oxide from fuel bound nitrogen.

Typically, the volume flow rate of preheated air to the mill is controlled in response to the feed rate of fuel to the mill. Also, the ratio of the flow rate of air to the feed rate of fuel changes over load with the ratio of air flow rate to the fuel feed rate increasing as load on the steam generator, and therefore fuel feed rate, decreases. As a consequence of the increase in the air flow rate to fuel feed rate as load decreases, the availability of oxygen in the pulverized fuel-air stream being conveyed to the furnace increases. That is, the air to fuel ratio, and therefore the pounds of oxygen available per pound of fuel, increases. This increase in air to fuel ratio as load decreases leads to a further increase in formation of nitrogen oxide from fuel bound nitrogen at low load.

One proposed solution to the problem of increased formation of nitrogen oxide at high air to fuel ratios in the transport stream has been to substitute recirculated flue gas for air as the gaseous medium feed to the mill to dry and transport the pulverized fuel. However, experience has shown that substituting recirculated flue gas for air as the transport medium led to ignition instability problems upon admission of the pulverized fuel-recirculated flue gas mixture to the furnace.

It is therefore an object of the present invention to provide a method of firing a pulverized fuel-steam generator wherein a mixture of recirculated flue gas and air can be used as the drying and conveying medium in the mill while ensuring satisfactory ignition stability.

A further object of the present invention is to limit nitric oxide formation from fuel bound nitrogen via controlling oxygen availability in the transport medium.

Still another object of the present invention is to maintain efficient drying within the mill while using a recirculated fuel gas and air mixture as the drying medium.

SUMMARY OF THE INVENTION

With the afore mentioned objects in view, there is provided in accordance with the present invention a method of firing a pulverized fuel-fired steam generator furnace comprising feeding solid fuel to the mill for pulverizing therein at a fuel feed rate controlled in response to load demand on the steam generator, supplying a mixture of recirculated cleaned flue gas and air to the mill for drying the pulverized fuel in the mill and conveying the pulverized fuel to the furnace, controlling the volume flow rate of the gaseous mixture of recirculated flue gas and air in response to the feed rate of fuel to the mill, to maintain a gaseous mixture to fuel weight ratio in the gaseous mixture of about but not less than 1.5.

The oxygen content of the gaseous mixture of recirculated flue gas and air entering the mill is measured and the volume flow rate of recirculated flue gas and the volume flow rate of air is controlled with respect to each other in response to the oxygen measurement so as to maintain the oxygen level in the gaseous mixture entering the mill at a level of at least 12% by volume and preferably in the range of 12 to 15% by volume.

DESCRIPTION OF THE PREFERRED EMBODIMENT

Figure 1:
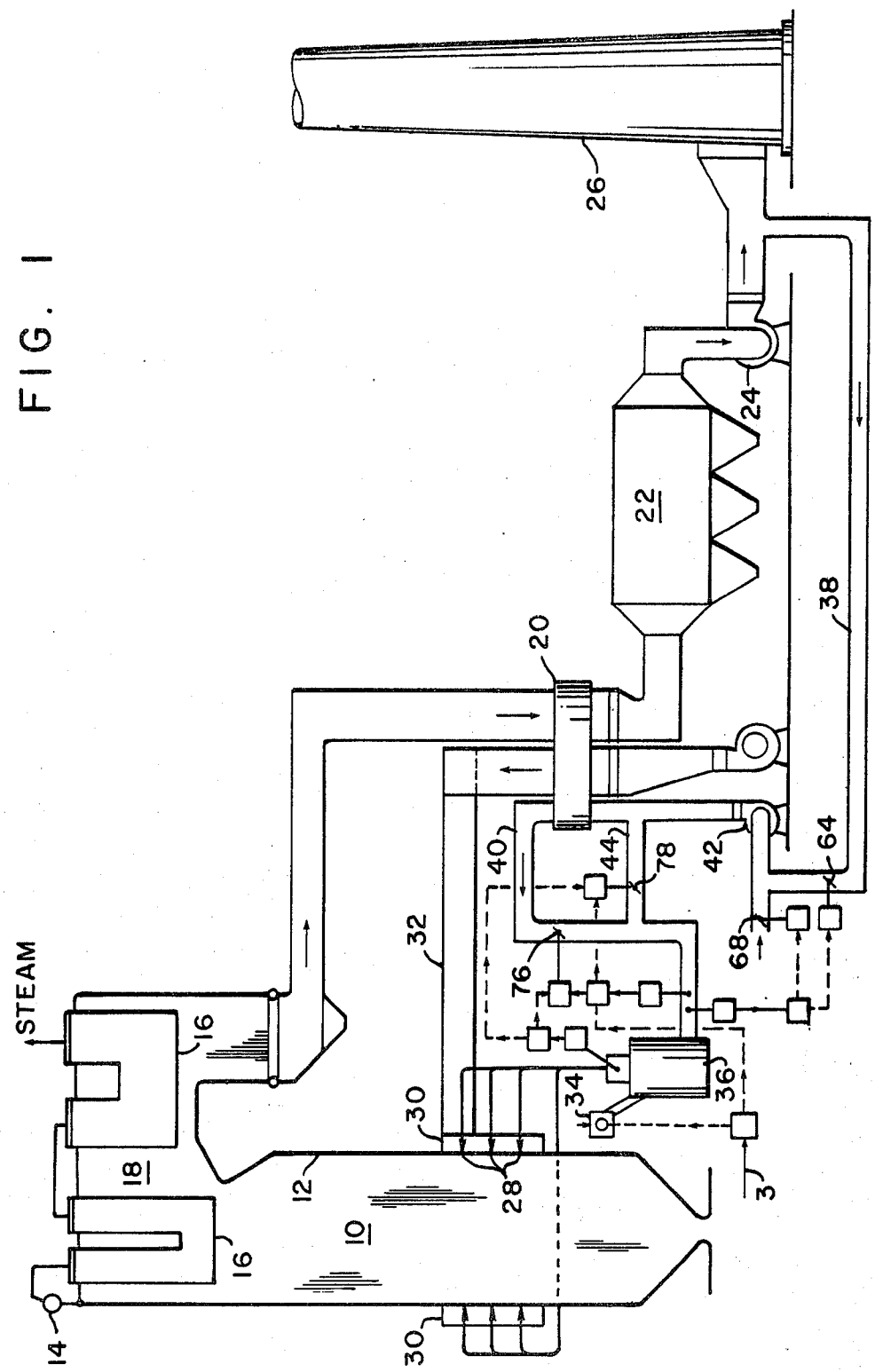
FIG. 1 is a sectional side elevational view showing a pulverized fuel-fired steam generator fired in accordance with the present invention.

Referring now to the drawing and particularly to FIG. 1, there is depicted therein a pulverized fuel-fired steam generator having a furnace 10 formed of water walls 12. To generate steam, water is passed upwardly through the water walls 12 wherein it absorbs heat from the combustion of fuel within the furnace 10. The water is first heated to saturation temperature and then partially evaporated to form a steam-water mixture. The steam-water mixture leaving the water walls 12 is collected in an outlet header and passed to drum 14 wherein the steam and water are separated.

The water separated from the steam-water mixture in the drum 14 is mixed with feed water and recirculated through the water walls 12. The steam removed from the steam-water mixture in the drum 14 is passed through heat exchange surface 16, such as superheat and reheat surface, disposed in the gas exit duct 18 which interconnects the furnace 10 with the steam generator stack for providing a flow passage for conveying the gases formed in the furnace to the stack. In passing through the heat exchange surface 16, the steam is heated as it passes in heat exchange relationship with the hot flue gases generated in the furnace 10 and leaving the furnace 10 through exit duct 18.

As the hot flue gas leaving the furnace 10 through gas exit duct 18 traverses the steam heating surface 16 disposed therein, the hot flue gas is cooled by transferring heat to the steam flowing through the steam heating surface 16 to a temperature typically in the range of 320° to 420° C. The flue gas is then typically further cooled to a temperature in the range of 120° to 150° C. by passing the flue gas in heat exchange relationship with combustion air being supplied to the furnace 10 through air preheater 20 disposed downstream of the furnace 10 in the gas exit duct 18. Also disposed downstream of the furnace 10 in gas exit duct 18 is a particulate collector 22 wherein ash particles and other particulate matter entrained in the flue gas during the combustion process is removed therefrom. The cool clean flue gas leaving the particulate collector 22 is passed through fan 24 and vented to the atmosphere via stack 26. The fan 24 boosts the pressure of the cool clean flue gas before it is vented to the atmosphere.

The furnace 10 is fired by injecting pulverized fuel into the furnace by burners 28 disposed in windboxes 30. Combustion air, which has been preheated by passing in heat exchange relationship in air preheater 20 with the flue gases leaving the furnace 10 through duct 18, is supplied through duct 32 to the wind box 30 for introduction to the furnace 10. In accordance with conventional practice, the amount of fuel injected into the furnace is controlled in response to load demand on the steam generator to provide the total heat release necessary to yield a desired steam generation for the given steam generator design.

In pulverized fuel firing, as shown in the drawing, solid fuel, such as raw coal, is fed from a storage bin (not shown) at a controlled rate through feeder 34 to pulverizer 36 wherein the fuel is comminuted to a fine powder like particle size. In a typical pulverized fuel fired furnace, preheated air is supplied to the pulverizer 36 from the air preheater outlet. As the preheated air sweeps through the pulverizer 36, the comminuted coal is entrained therein and dried by the preheated air stream. The preheated air used in drying the pulverized coal is also used to transport the pulverized coal to the burners 28.

At full load, the air used to dry the pulverized coal and transport the coal to the burners is typically 10 or 15% of the total combustion air supplied to the furnace 10 through windbox 30. However, at low loads the preheated air used in drying the pulverized coal and transferring the coal to the furnace increases from 20% to 30% of the total combustion air. Naturally, the amount of fuel supplied to the furnace 10 as load decreases also decreases. Therefore, on a typical coal fired furnace, the ratio on a weight basis of the air flow rate to pulverizers 36 to the fuel feed rate thereto increases from about 1.5 at full load to as high as 3 or 4 at low load. As a result of this increased oxygen availability in the transport stream at low loads, it is thought that a greater amount of nitrogen inherently bound in the coal is converted to nitrogen oxides at low load than is converted at high loads.

In order to reduce the conversion of fuel bound nitrogen to nitrogen oxide at low load, it is contemplated by the present invention to control the amount of air, and therefore the oxygen content, in the transport stream by substituting cooled clean recirculated flue gas for a portion of the air flow normally supplied to the pulverizer 36. In accordance with the present invention, a portion of the cooled clean flue gas passing from the outlet of booster fan 24 to the stack 26 is recirculated through duct 38 and mixed with the ambient air supply for the pulverizer 36. The air and recirculated flue gas mixture is then conveyed through duct 40 to the pulverizer 36 by fan 42.

As the air and recirculated flue gas mixture traverses duct 40 it passes through air preheater 20 where it is passed in heat exchange relationship with the flue gases leaving the furnace 10 through exit duct 18 and is therefore preheated typically to a temperature in the range of 260° to 400° C. As will be described in more detail later, a portion of the air and fuel gas mixture may be bypassed around the air heater 20 through duct 44 and is remixed with the preheated air and flue gas mixture as a means of fine tuning the temperature of the gaseous mixture supplied to the mill 36.

Figure 2:
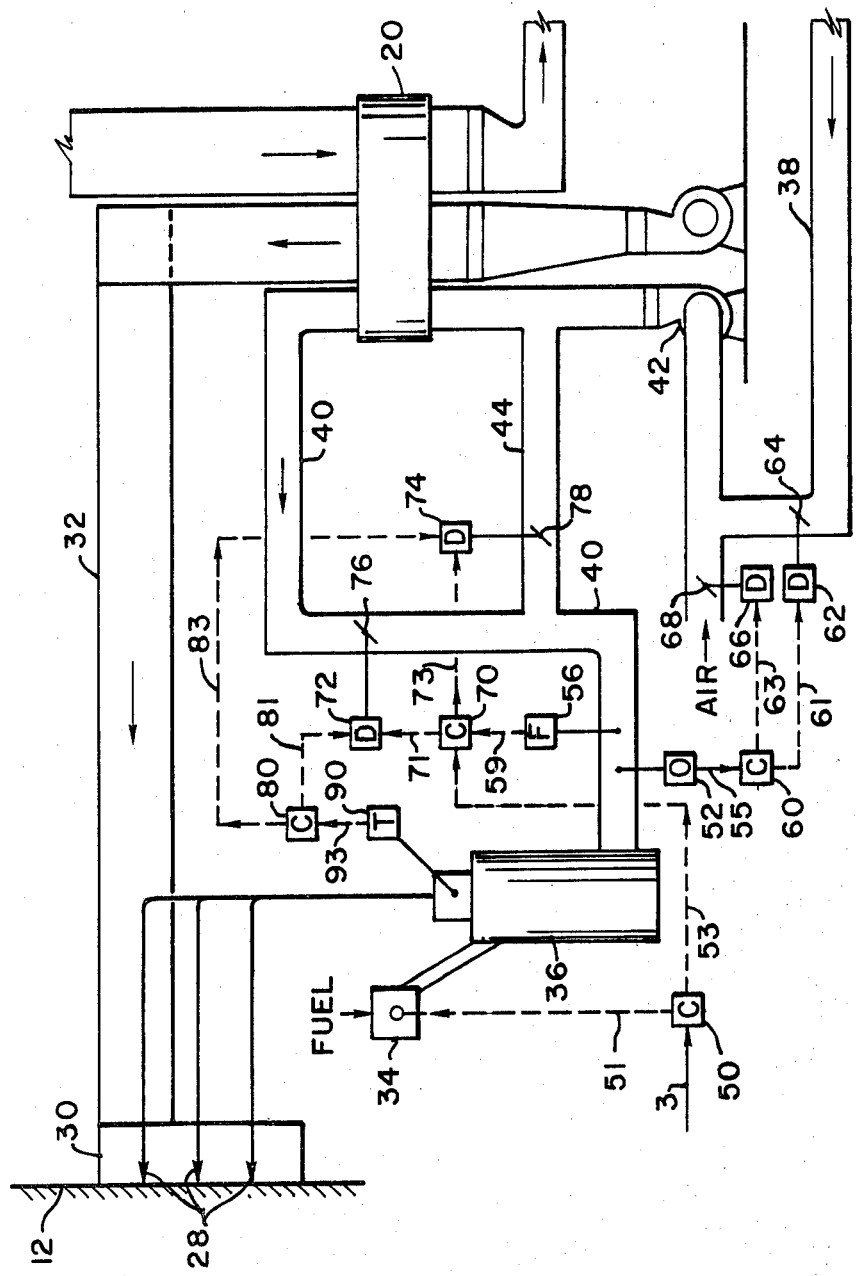
FIG. 2 is an enlarged side elevation view showing the means for controlling fuel, air, and recirculated gas flow in accordance with the present invention.

The control of the furnace firing process may be obtained through a series of dampers and controllers as best illustrated in FIG. 2. A master signal 3 indicative of steam generator load is sent to fuel feed controller 50. In response thereto the fuel feed controller 50 generates and transmits a signal 51 to feeder 34 which in response thereto regulates the rate of fuel feed to the pulverizer 36. Additionally, the controller 50 generates and transmits a second signal 53 indicative of the fuel feed rate to mixture volume flow rate controller 70.

The air and fuel gas flow controller 60 receives a signal 55 from the oxygen monitor 52 disposed in gas duct 40 at the inlet to the mill 36. Signal 55 is indicative of the oxygen content of the air and recirculated flue gas mixture entering the mill 36. In response to signal 55, the controller 60 sends a control signal 61 to damper drive 62 to selectively open or close flue gas damper 64 disposed in flue gas recirculation duct 38 and a control signal 63 to damper drive 66 to selectively open or close air damper 68 in the air supply duct.

In accordance with the present invention, the flue gas damper 64 is manipulated by controller 60 so as to maintain the oxygen level in the gaseous mixture entering the mill 36 at a level of at least 12% by volume and preferably within the range of 12 to 15% by volume. It is important that the oxygen level in the gaseous mixture entering the mill stay above 12% as combustion instability will occur within the furnace if the oxygen level in the transport stream drops below 12%. Further, it is advisable to keep the oxygen level in the transport stream in the range of 12 to 15% in order to reduce nitric oxide formation from the oxidation of fuel bound nitrogen. If air only were used as a transport medium, the oxygen level would be approximately 21% by volume.

A volume flow monitor 56 is disposed in the gas duct 40 near the inlet to the mill 36 to monitor the volume flow rate of the gaseous mixture of air and recirculated flue gas therethrough. Flow monitor 56 sends a signal 59 indicative of the volume flow rate of gaseous mixture to the mill to controller 70. In response to signal 53 indicative of fuel feed rate and signal 59 indicative of mixture volume flow rate, the controller 70 sends a control signal 71 to damper drive 72 and a control signal 73 to damper drive 74 to selectively open or close dampers 76 and 78 respectively. Controller 70 is preprogrammed to maintain the volume flow rate of the gaseous mixture of air and recirculated flue gas to the mill at a preselected value dependent upon the instantaneous fuel feed rate. On a weight basis, the ratio of the flow of gaseous mixture to fuel feed should be maintained at a value greater than about 1.5 in order to ensure that there is sufficient volume of gaseous mixture to dry the coal and transport the coal to the furnace.

In order to ensure proper drying of the pulverized coal in the mill 36, the gaseous mixture supplied to the mill 36 must be at a sufficient temperature to provide enough heat to evaporate moisture contained in the fuel pulverized in the mill 36. Additionally, the temperature of the gaseous mixture leaving the mill must be high enough to ensure that the moisture evaporated from the fuel does not condense as the fuel is being conveyed to the furnace. Therefore, a temperature monitor 90 is disposed at the outlet of the mill 36 to monitor the temperature of the gaseous mixture transporting the pulverized fuel from the mill to the burners 36.

The temperature monitor 90 generates and transmits a signal 93 indicative of the mill outlet gas temperature to the gaseous mixture temperature controller 80. In response thereto, the controller 80 generates and transmits a control signal 81 to damper drive 72 and a control signal 83 to damper drive 74. Damper drive 72 actuates damper 76 disposed in gas duct 40 at a location just downstream of the air preheater 20. Damper drive 74 actuates damper 78 disposed in gas duct 44 which is the bypass duct for bypassing a portion of the gaseous mixture around the air preheater. By selectively opening and closing dampers 76 and 78 relative to each other, controller 80 maintains the temperature of the coal and gaseous mixture leaving the mill 36 at a level of about 85° C.

Controllers 70 and 80 cooperate with each other by means of feed back signals so that dampers 76 and 78 may be selectively opened or closed to maintain both the volume flow rate of the gaseous mixture to the mill at a preselected level dependent upon fuel feed rate and also simultaneously to maintain temperature of the gaseous mixture entering the mill at a level sufficient to ensure that the temperature mixture leaving the mill is at about 85° C. By selectively positioning dampers 76 and 78, the gaseous mixture of recirculated flue gas and air is separated into a first portion which is passed in heat exchange relationship with the flue gas leaving the furnace through the air preheater 20 and a second portion which is not preheated, but bypasses the air preheater 20 through duct 44 to remix with the preheated gaseous mixture passing through duct 40 at a location downstream of damper 76 prior to entering the mill 36. By selectively positioning the damper 78, the temperature of the gases of the preheated gaseous mixture leaving air heater 20 may be tempered with an unheated gaseous mixture to control mill outlet temperature.

Accordingly, it will be appreciated that the applicant has provided an improved method of firing a pulverized fuel-fired furnace wherein the oxygen content of the gaseous mixture supplied to the mill for drying the pulverized coal and transporting the pulverized coal to the furnace can be controlled to yield reduced nitrogen oxide formation by mixing recirculated flue gas with air through an intergrated control system while simultaneously ensuring ignition stability by maintaining a safe level of oxygen and air in the gaseous mixture.

While the applicant has illustrated and described herein the preferred embodiment of his invention, it is to be understood that such is merely illustrative and not restrictive in that variations and modifications by those skilled in the art may be made thereto without departing from the scope and spirit of the invention as recited in the claims appended hereto.

I claim:

1. In a steam generator for burning pulverized fuel having a mill for pulverizing the fuel, a furnace wherein the fuel is burned thereby generating hot flue gas, steam heating surface disposed downstream of the furnace in the flow path of the hot flue gas leaving the furnace whereby heat is transferred from the hot flue gas thereby cooling the flue gas traversing said steam heating surface, a particle collector disposed downstream of the furnace wherein particles entrained in the flue gas are removed therefrom, and a fan disposed downstream of said heating surface and said particle collector for boosting the pressure of the cooled clean flue gas before it is vented to the atmosphere, a method of firing said steam generator comprising:

a. feeding solid fuel to the mill for pulverizing therein at a controlled rate in response to load demand on the steam generator;
   b. recirculating a portion of the cooled clean flue gas leaving said booster fan to the mill;
   c. mixing ambient air into the recirculated flue gas before introducing the gaseous mixture thereof into the mill;
   d. conveying the fuel pulverized in the mill to the furnace entrained in said gaseous mixture of recirculated flue gas and air;
   e. controlling the volume flow rate of said gaseous mixture to the mill in response to the feed rate of fuel to the mill;
   f. measuring the oxygen content of said gaseous mixture of recirculated flue gas and air entering the mill; and
   g. controlling the volume flow rate of recirculated flue gas and the volume flow rate of air with respect to each other in response to said oxygen measurement so as to maintain the oxygen level in said gaseous mixture entering the mill at a level of at least 12% by volume.

2. A method of operation as recited in claim 1 wherein the oxygen level in said gaseous mixture entering the mill is maintained at a level in the range of 12 to 15% by volume.

3. A method of operation as recited in claim 1 further comprising:

a. prior to introducing said gaseous mixture of recirculated flue gas and air into the mill, separating said gaseous mixture into a first portion and a second portion;
   b. passing said first portion of said gaseous mixture in heat exchange relationship with the flue gas leaving the steam heating surface thereby preheating said first portion and further cooling the flue gas;
   c. remixing the preheated first portion of said gaseous mixture with the unpreheated second portion thereof prior to introducing said gaseous mixture into the mill;
   d. measuring the temperature of the gaseous mixture leaving the mill; and
   e. controlling the volume flow rate of the preheated first portion and the volume flow rate of the unpreheated second portion of said gaseous mixture with respect to each other in response to mill outlet temperature to control mill outlet temperature.

* * * * *